(12) United States Patent
Renger et al.

(10) Patent No.: US 11,225,184 B2
(45) Date of Patent: Jan. 18, 2022

(54) DEVICE FOR A RECEIVING AND TRANSPORTING COMPONENTS, IN PARTICULAR PIPES OR TUBES, MATERIAL COLLECTING CONTAINER FOR A VEHICLE AND SUCTION EXCAVATOR COMPRISING SAID TYPE OF DEVICE

(71) Applicant: RSP GMBH, Saalfeld (DE)

(72) Inventors: Karl-Heinz Renger, Saalfeld (DE); Marina Renger, Saalfeld (DE); Jens Graber, Saalfeld (DE)

(73) Assignee: RSP GMBH, Saalfeld (DE)

( * ) Notice: Subject to any disclaimer, the term of this patent is extended or adjusted under 35 U.S.C. 154(b) by 293 days.

(21) Appl. No.: 16/478,953

(22) PCT Filed: Jan. 18, 2018

(86) PCT No.: PCT/EP2018/051223
§ 371 (c)(1),
(2) Date: Jul. 18, 2019

(87) PCT Pub. No.: WO2018/134312
PCT Pub. Date: Jul. 26, 2018

(65) Prior Publication Data
US 2020/0406808 A1    Dec. 31, 2020

(30) Foreign Application Priority Data
Jan. 19, 2017   (DE) .................... 20 2017 100 264.0

(51) Int. Cl.
*B60P 1/64*      (2006.01)
(52) U.S. Cl.
CPC .................................. *B60P 1/6418* (2013.01)

(58) Field of Classification Search
CPC .. B60P 1/6418; B60P 7/12; F16L 3/08; B60R 9/04
(Continued)

(56) References Cited

U.S. PATENT DOCUMENTS 2,765,940 A * 10/1956 Nelson .................. B60P 3/1025
                                                          414/462
3,720,334 A *  3/1973 Permut .................. B60P 3/1025
                                                          414/462
(Continued)

FOREIGN PATENT DOCUMENTS

CA          3019430 A1 * 10/2017 ............ E02F 9/0883
DE      29 31 882 A1    3/1981
(Continued)

*Primary Examiner* — Hilary L Gutman
(74) *Attorney, Agent, or Firm* — Mayer & Williams PC; Stuart H. Mayer

(57) ABSTRACT

The invention relates to a device (07) for receiving and transporting components, in particular pipes or tubes (15), on a vehicle (01). The vehicle (01) carries a container (03) having a container cover (05) that is tiltable about a cover axis (19). A carrier (12) of the device is mountable on the container cover (05). An adjustment drive (22) that can pivot the carrier (12) about a pivot axis (21) between a transport position and a working position is preferably also present. Also provided are a retaining device (13) for accommodating at least one component (15), and a drive unit for moving the retaining device (13) relative to the carrier (12) between an upper holding position and a lower removal position. The invention further relates to a suction excavator (01) having a material collection container (03) that includes such a device for receiving and transporting pipes.

6 Claims, 6 Drawing Sheets

(58) Field of Classification Search
USPC ............................ 410/42; 414/462; 296/182.1
See application file for complete search history.

(56) References Cited

U.S. PATENT DOCUMENTS

| | | | | |
|---|---|---|---|---|
| 4,003,485 A * | 1/1977 | Edgerton | ............. | B60P 3/1025 |
| | | | | 414/462 |
| 4,329,100 A * | 5/1982 | Golze | .................. | B60R 9/055 |
| | | | | 177/136 |
| 5,603,600 A * | 2/1997 | Egan | .................. | B60P 3/1058 |
| | | | | 280/414.1 |
| 5,649,655 A * | 7/1997 | Kerner | .................. | B60R 9/042 |
| | | | | 224/310 |
| 6,158,638 A * | 12/2000 | Szigeti | .................. | B60R 9/042 |
| | | | | 224/310 |
| 6,176,672 B1 * | 1/2001 | Egan | .................. | B60P 3/122 |
| | | | | 414/462 |
| 6,273,668 B1 * | 8/2001 | Kameda | .............. | A61G 3/0209 |
| | | | | 224/321 |
| 6,428,263 B1 * | 8/2002 | Schellens | ................ | B60R 9/042 |
| | | | | 224/310 |
| 6,679,407 B2 * | 1/2004 | Weeks | .................. | B60R 9/042 |
| | | | | 224/310 |
| 6,681,970 B2 * | 1/2004 | Byrnes | .................. | B60R 9/042 |
| | | | | 224/310 |
| 6,755,332 B2 * | 6/2004 | Crane | .................. | B60R 9/00 |
| | | | | 224/321 |
| 7,137,479 B2 * | 11/2006 | Ziaylek | ................ | B60R 9/0423 |
| | | | | 182/127 |
| 8,322,580 B1 * | 12/2012 | Hamilton | ............... | B60R 9/055 |
| | | | | 224/310 |
| 2007/0090139 A1 * | 4/2007 | McKenzie | ........... | B60R 9/0485 |
| | | | | 224/310 |
| 2010/0183396 A1 * | 7/2010 | Schmidt | .................. | B60P 7/12 |
| | | | | 410/42 |
| 2012/0263561 A1 | 10/2012 | Zhengxin | | |
| 2013/0315693 A1 * | 11/2013 | Diverdi | ................ | B60R 9/0423 |
| | | | | 414/462 |
| 2014/0169918 A1 * | 6/2014 | Buller | .................. | B60R 9/042 |
| | | | | 414/462 |
| 2015/0125245 A1 * | 5/2015 | Gallagher | ............... | B60R 9/042 |
| | | | | 414/462 |

FOREIGN PATENT DOCUMENTS

| | | | | |
|---|---|---|---|---|
| DE | 90 16 448 U1 | 2/1991 | | |
| DE | 44 21 030 C1 | 7/1995 | | |
| DE | 10 2012 003226 A1 | 2/2013 | | |
| DE | 102012009576 A1 * | 11/2013 | ............... | E02F 7/06 |
| FR | 2970992 A1 | 8/2012 | | |
| WO | WO2021069391 A1 * | 4/2021 | ............... | E02F 3/88 |

\* cited by examiner

DEVICE FOR A RECEIVING AND TRANSPORTING COMPONENTS, IN PARTICULAR PIPES OR TUBES, MATERIAL COLLECTING CONTAINER FOR A VEHICLE AND SUCTION EXCAVATOR COMPRISING SAID TYPE OF DEVICE

BACKGROUND OF THE INVENTION

The present invention relates to a device for receiving and transporting components, in particular pipes or tubes, on a vehicle. The invention further relates to a material collection container for a vehicle having a device for receiving and transporting components, in particular pipes or tubes. The invention further relates to a material collection container, and a suction excavator having such a device.

DE 10 2015 105 836 B3 describes a suction excavator with flow reversal, wherein the suction excavator is used to pneumatically receive solid or liquid suction material by means of an air stream that rapidly flows through a suction hose. The suction excavator has a separator for separating the suction material. The separator is used as a collection container.

DE 20 2005 006 671 U1 describes a suction excavator having a suction blower and a tiltable container. The container, which is situated between a suction nozzle and a suction blower, is used to separate and collect suctioned material. For emptying, the container is tiltable about a tilt axis.

DE 10 2012 003 226 A1 discloses a tiltable container, in particular for suction excavators. The suction excavator includes a container that is tiltable about a tilt axis for separating and collecting suctioned material.

The earlier patent application DE 10 2016 105 850 by the present applicant, unpublished at the time of the present filing, describes a material collection container of a suction excavator having a suction connection on its rear end-face wall. The suction connection is positioned on the rear end-face wall in such a way that in the cross section it is intersected by the plane of symmetry of the material collection container.

A lifting jack is known from DE 201 17 060 U1 which may be situated in particular on a vehicle for onboard lifting of loads, for example the suction tube of a suction excavator. The lifting jack allows only a single tube to be raised or lowered.

DE 29 31 882 A1 describes a roof stand for motor vehicles, in particular passenger vehicles, having an assembly for holding and fastening heavy loads. A tilting frame is pivotably supported on a carrier frame. The tilting frame has a telescopically extendable boom. A carriage that accommodates the load is movably guided along the tilting frame and the boom.

EP 1 055 560 A1 describes a loading and unloading device for an elongated load (a fire ladder, for example). A load mounting may be moved from a horizontal position on the vehicle roof into an inclined position.

Proceeding from the prior art, the object of the present invention is to provide an improved device that is used for receiving and transporting components, in particular pipes or tubes, wherein multiple components (pipes or tubes, for example) may be easily and safely transported. At the same time, this device is intended in particular to meet the safety requirements for receiving and removing pipes and tubes and other construction site equipment, and to simplify and speed up the receiving and removal of such components. Furthermore, the device is intended in particular for providing tiltable container approaches known from the prior art.

SUMMARY OF THE INVENTION

The object is achieved according to the invention by a device for receiving and transporting components, in particular pipes or tubes, according to appended claim 1, by a material collection container for a vehicle according to claim 10, and by a suction excavator according to claim 15.

The device according to the invention is used to receive and transport components on a vehicle. Such components are in particular pipes or tubes, but may also be some other machine accessories, tools, or construction site equipment. If only pipes are referred to below, tubes are always also intended when they have the same functionality as pipes with regard to the conduction of media. In general, similar components are likewise intended which may be transported by the device in the same way.

In particular, the device is used to receive and transport material transport pipes on the vehicle. The vehicle may be, for example, a suction excavator, a sewer cleaning vehicle, a pump vehicle, or also a ship that is provided as a hydraulic engineering vehicle. The vehicle is particularly preferably a suction excavator. The vehicle preferably has a material collection container for separating and collecting suctioned material. The material collection container includes a container cover that is tiltable about a cover axis. The material collection container bears the container cover.

In a first embodiment, the device includes a carrier, having a pivot axis, that is mountable on the container cover so that the pivot axis extends in parallel to the cover axis. Accordingly, the cover axis and the pivot axis extend on the same side of the container or of the container cover. The carrier is preferably made of a stable material such as steel or stainless steel. The carrier is preferably aligned on the container cover along its side edges. For pivoting the carrier on the pivot axis, the device has an adjustment drive that is preferably formed by at least one hydraulic cylinder. The adjustment drive acts on the carrier, on which the adjustment drive is situated. The carrier may assume a transport position or a working position by pivoting the carrier about the pivot axis by means of the adjustment drive.

In addition, the device includes a holding device for receiving and holding a pipe or a tube, preferably for receiving multiple pipes or tubes. On a rack, the holding device has receptacles for the individual pipes or tubes, the rack preferably being approximately the same size as the carrier and preferably made of a lightweight, stable material such as steel or stainless steel, and the receptacles preferably being adaptable to the pipe or tube diameter. The receptacles are made of steel, for example, and covered with a rubber profile. Alternatively, the receptacles have a design that corresponds to a pipe or tube diameter. The holding device may thus be regarded as a pipe magazine or tube magazine.

The holding device is connected to the carrier via at least one linear guide, in particular a rail guide. The holding device and the carrier are preferably connected by means of two rail guides extending in parallel. The holding device, the carrier, and the rail guide are oriented in parallel to one another, so that the holding device may be moved in parallel to the carrier. The rail guide is oriented at an angle with respect to the pivot axis. When multiple rail guides are used, they are oriented in parallel to one another.

The device also has a drive unit for moving the holding device relative to the carrier, with movement along the rail guide. As the result of moving by means of the drive unit, the holding device assumes an upper holding position or a lower removal position, wherein movement can take place between the two positions.

Preferred embodiments of the device according to the invention are described below in conjunction with a material collection container according to the invention and a suction excavator according to the invention.

The material collection container according to the invention for a vehicle, for example a suction excavator, includes a container base, a container cover, and a device that is situated on the container cover, which corresponds to the device described here for receiving and transporting pipes or tubes, and their described embodiments. The container cover is tiltable about a cover axis. The container cover is customarily opened for emptying or filling the container. However, the pivotability of the cover about the cover axis, which is thus present anyway, is now also used to bring the carrier of the device for receiving and transporting pipes into an essentially upright position.

The carrier having the pivot axis is mounted on the container cover, so that the pivot axis extends in parallel to the cover axis. The adjustment drive, which is used to pivot the carrier about the pivot axis, is preferably situated between the container cover and the carrier, and acts between same. The carrier may thus assume a transport position parallel to the container cover, and a working position. In the working position, the carrier is situated at an angle with respect to the container cover, and thereby preferably assumes a vertically oriented position.

The main plane of extension of the carrier in the working position is preferably oriented at a right angle to the container base. When the material collection container is moved with the device, for example when the material collection container is situated on a vehicle, the carrier is in the transport position, preferably parallel to the container cover, wherein the container cover closes the container, and the carrier rests as flatly as possible on the container cover so that the height of the vehicle does not exceed an allowable maximum height.

The adjustment drive includes a further actuating cylinder, preferably a hydraulic cylinder, by means of which the container cover is tilted. The same actuating cylinder with which the container cover is opened for emptying the container may be used for this purpose.

The pivoting of the carrier and the movement of the holding device into the lower removal position preferably take place with the container cover open, i.e., tilted with respect to the upper container opening. This results in the advantage that, due to the device according to the invention, the material collection container with the container cover is utilized in such a way that the path and application of force for the adjustment drive that moves the carrier are reduced. Alternatively, however, in modified embodiments it is also possible to pivot the carrier about a large angle, so that the container cover may remain closed when the carrier is brought into the working position.

The upper holding position or the lower removal position, between which the holding device may be moved, is reached by movement by means of the drive unit. In the upper holding position, the side of the holding device, which is oriented in the direction of the container base, is situated above the container cover, preferably at approximately the level of the pivot axis, the carrier having previously been brought into the working position with the holding device. In the lower removal position, the lower side of the holding device is situated in the plane of the container base or below this plane. Alternatively, the lower removal position of the holding device is selected in such a way that comfortable loading and unloading of the pipes or tubes by a user are possible. For ergonomic handling, multiple removal positions may also be defined which may be moved into in succession during removal of multiple pipes. For this purpose, various positions between the upper holding position and the lower removal position are preferably moved into in a stepwise manner.

The drive unit is preferably likewise formed by an actuating cylinder. Alternatively, the drive unit may be formed by an electric motor and a cable winch that is driven by the electric motor. Another alternative is for the drive unit to be formed by a linear drive.

The movement path of the rail guide that is situated between and acts between the carrier and the holding device is preferably oriented at a right angle to the pivot axis. Alternatively, the rail guide is situated between 45° and 90° with respect to the pivot axis, so that the holding device in the lower removal position along the pivot axis has an offset position, compared to the position assumed by the holding device in the lower removal position with the rail guide at a right angle. The rail guide, as known, is made up of two cooperating rails.

In one embodiment, the holding device has a safety mechanism. The safety mechanism is used to secure the pipes or tubes during the pivoting of the carrier with the holding device, during the movement of the holding device relative to the carrier, and during the movement of the material collection container onto a vehicle. That is, when a movement takes place, the safety mechanism acts in such a way that the pipes or tubes are held in their respective position on the holding device. When the holding device reaches the lower removal position, the safety mechanism is deactivated, thus allowing removal of the pipes or tubes by persons. The opening of the safety mechanism particularly preferably takes place shortly before completion of the movement of the holding device, i.e., just before the lower removal position is reached. The safety mechanism of the holding device is preferably designed as a spring mechanism that includes a spring for releasing the pipes or tubes.

In another embodiment, in addition to the hydraulic cylinder at least one pneumatic spring acts as an adjustment drive between the container cover and the carrier. Two pneumatic springs are particularly preferably situated between the container cover and the carrier. The pneumatic spring is preferably designed as a gas spring.

In one embodiment, the carrier is designed as a rectangular frame, with the carrier sides situated parallel to the container cover sides. The carrier particularly preferably has three frame parts that are situated parallel to the container cover sides, corresponding to an open rectangular shape.

A suction excavator according to the invention, as a preferred embodiment of the vehicle to which the invention relates, includes an above-described material collection container with a tiltable container cover, and an above-described device for receiving and transporting pipes or tubes. The described embodiments also apply for the suction excavator.

In addition, a control element for operating the drive unit is preferably provided on the vehicle. This control element is preferably situated at a location that is easily accessible by the operator.

The side of the holding device, which is oriented in the direction of the container base, is particularly preferably situated at approximately the level of the vehicle floor in the lower removal position.

In one embodiment, the pivoting of the carrier is not necessary when the container cover is tilted in such a way that the angle between a container top side and the container cover is between 60° and 90°.

According to a further embodiment of the device, the carrier has a modified design, in particular with omission of the pivot axis. Instead, the carrier is nonpivotably mounted on the container cover. To allow the holding device to move into the lower removal position, the container cover is opened wide so that the angle of the container cover with respect to the container top side is preferably between 75° and 90°. The holding device may then be moved downwardly in parallel to the carrier without having to pivot the carrier with respect to the container cover.

The device according to the invention, the material collection container according to the invention, and the suction excavator according to the invention have the advantage that multiple pipes or tubes may be easily and securely supported on the material collection container or the vehicle, transported by means of same, and carried without great effort by persons to the material collection container or the vehicle. Thus, it is not necessary for persons to climb onto the material collection container or the vehicle, with increased safety risks, since the loading and unloading take place from the ground.

BRIEF DESCRIPTION OF THE DRAWINGS

Further advantages and particulars of the present invention result from the following description of one preferred embodiment, with reference to the drawings, which show the following.

DETAILED DESCRIPTION

Figure 1:
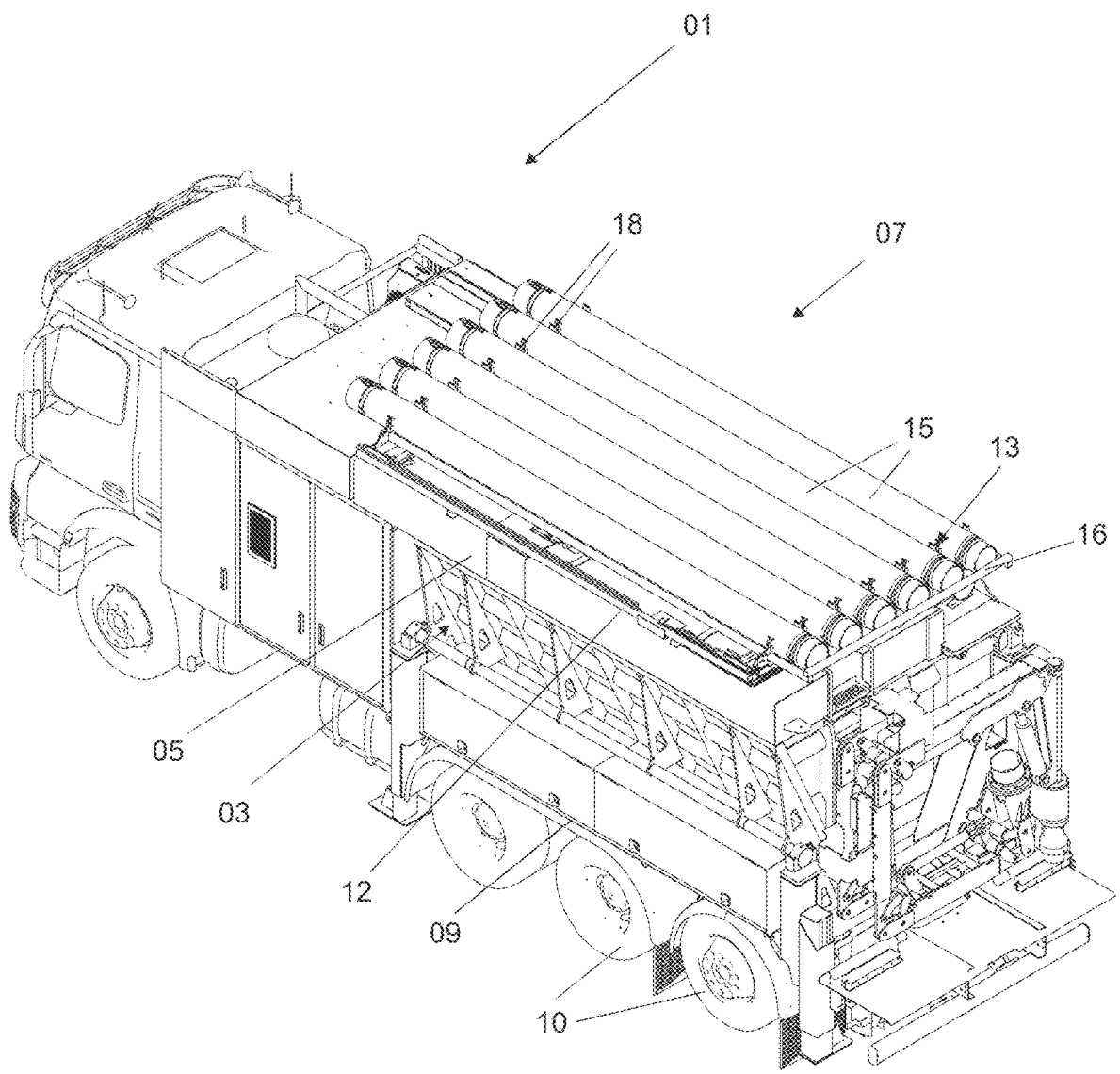
FIG. 1 shows a perspective view of a suction excavator together with a material collection container, which has a tiltable container cover on which a first embodiment of a device according to the invention for receiving and transporting pipes or tubes is mounted.

FIG. 1 shows a perspective view of a suction excavator 01 together with a material collection container 03, which has a tiltable container cover 05. A device 07 for receiving and transporting pipes or tubes is mounted on the container cover 05. The material collection container 03 is used to receive suction material that is taken up by means of the suction excavator 01 and subsequently transported away. The container cover 05 is situated on the top side of the material collection container 03. The material collection container 03 has a container base 09. The suction excavator 01 has multiple wheels 10 that are used for moving the suction excavator 01.

The device 07 includes a carrier 12 that is mounted on the container cover 05. The carrier 12 is preferably made of metal. The device 07 also includes a holding device 13 that holds multiple pipes or tubes 15. The holding device 13 is made up of a rack 16 and multiple receptacles 18 that are mounted on the rack 16. A pipe 15 is situated in each receptacle 18, the receptacles 18 being situated at opposite sides of the rack 16 and in pairs holding one pipe 15 in each case. The receptacles 18 are adaptable to the diameter of the pipes 15 to be transported. The pipes 15 are fastened by means of a safety mechanism. The holding device 13 is mounted on the carrier 12.

Figure 2:
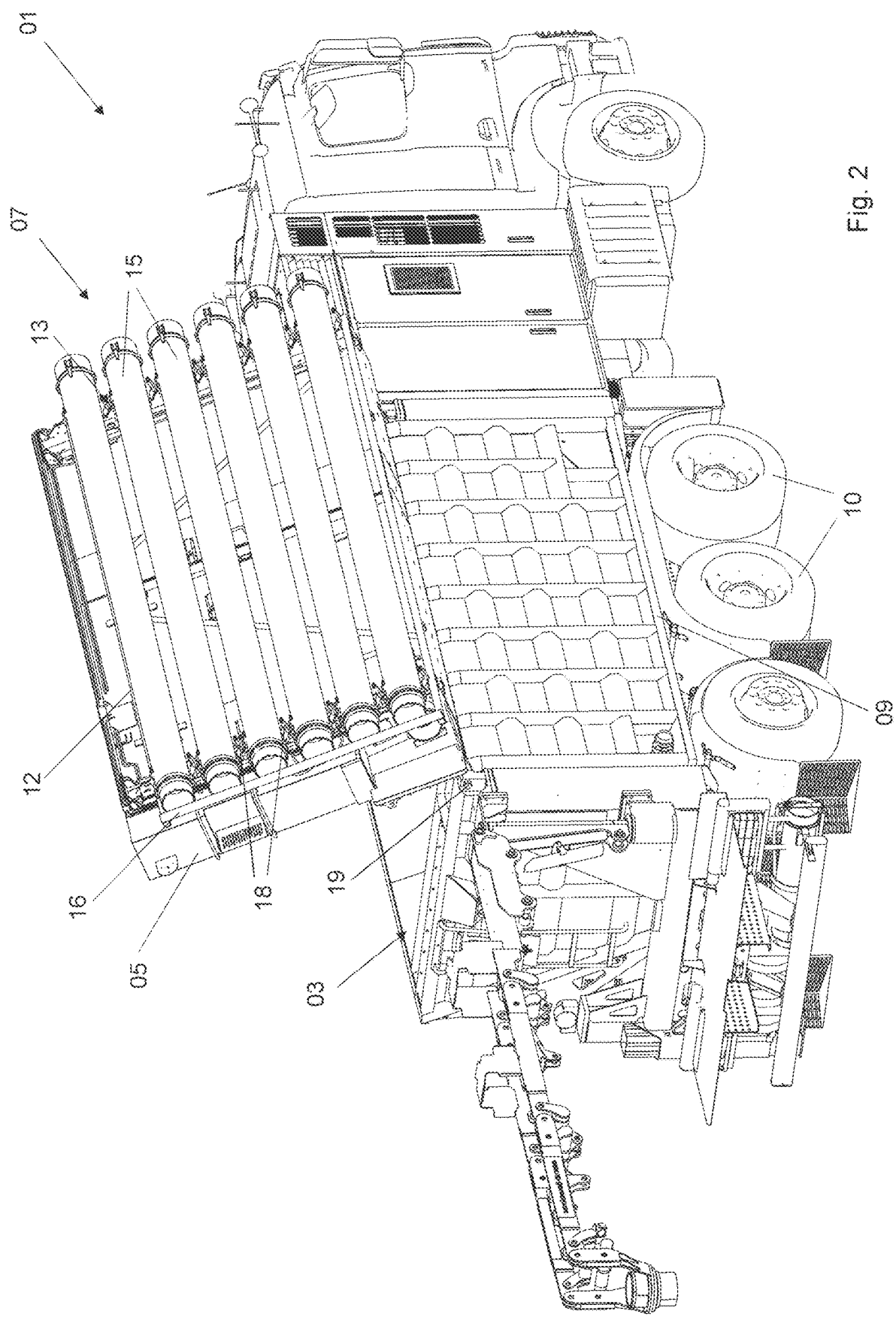
FIG. 2 shows a perspective view of the suction excavator, with the container cover together with the device tilted.

FIG. 2 shows a perspective view of the suction excavator 01. In contrast to FIG. 1, the container cover 05 together with the device 07 is illustrated in a tilted or opened-up position. The container cover 05 is tiltable about a cover axis 19. The cover axis 19 extends along one side of the container cover 05. However, embodiments are also possible in which the container cover is equipped with two cover axes, so that it is possible to open the container cover at both sides.

The carrier 12 in FIG. 1 is in a transport position, with the carrier 12 situated parallel to the container cover 05. The container cover 05, the carrier 12, and the holding device 13 of the device 07 are still parallel to one another in FIG. 2, although in the state shown in FIG. 2 the suction excavator should no longer be driven on the street, since the allowable height would be exceeded.

Figure 3:
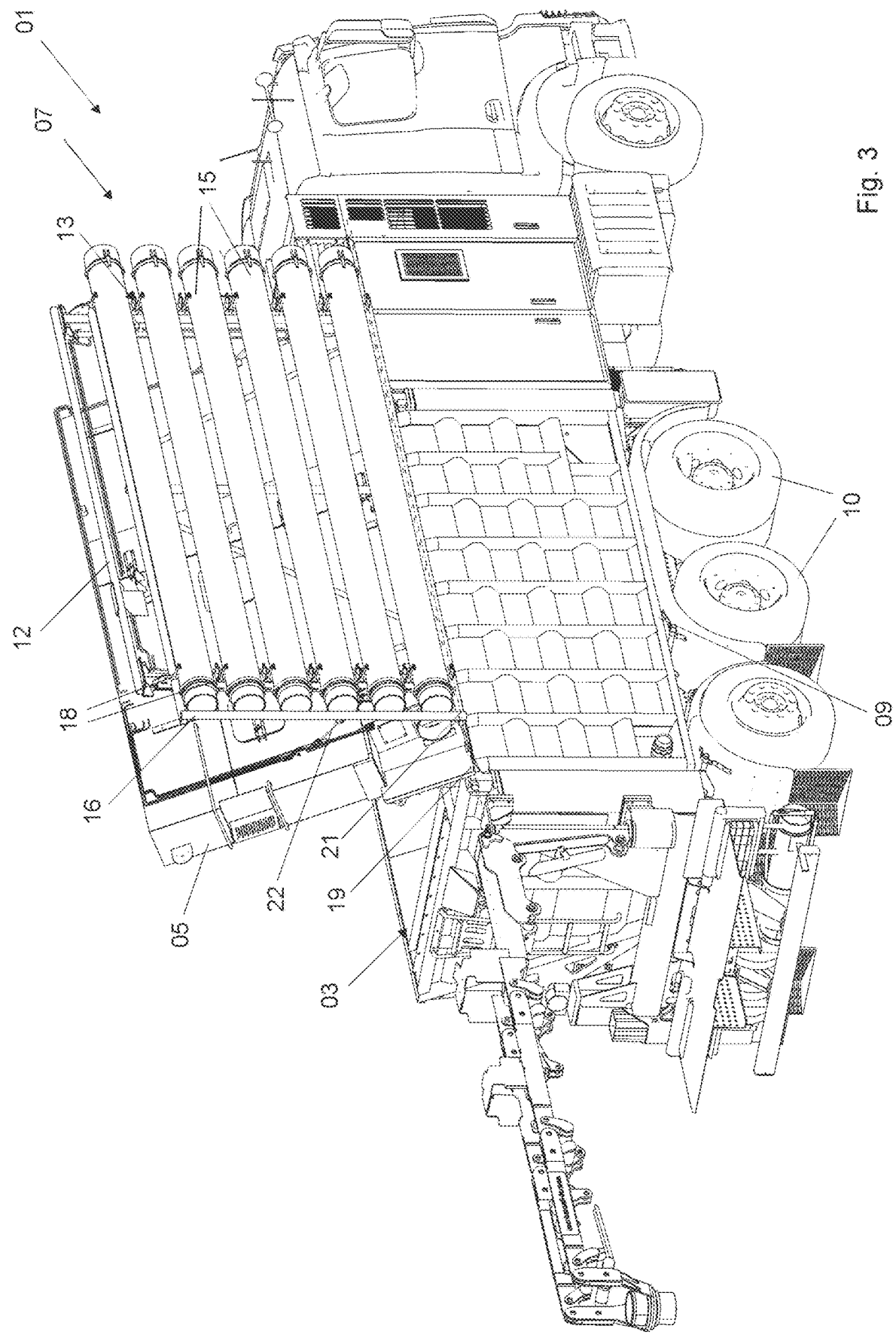
FIG. 3 shows a perspective view of the suction excavator, with the container cover tilted and a portion of the device pivoted.

FIG. 3 shows a perspective view of the suction excavator 01. In contrast to FIG. 1, the container cover 05 together with the device 07 is tilted or opened up. Furthermore, and in contrast to FIG. 2, the device 07 is pivoted with respect to the container cover 05. The carrier 12 has a pivot axis 21 that extends in parallel to the cover axis 19 on one side of the rack 16, this rack side being situated on the same side as the container cover side on which the cover axis 19 is situated. The carrier 12 is pivotable with respect to the container cover 05 along the pivot axis 21. The cover axis 19 and the pivot axis 21 are situated on the same side of the container, and extend in parallel. The carrier 12 and the container cover 05 are connected to one another by two actuating cylinders 22 (also referred to below as hydraulic cylinders). The carrier 12 is pivoted with respect to the container cover 05 on the pivot axis into a working position by means of the hydraulic cylinders 22, with the carrier 12 situated perpendicular, i.e., at a 90° angle, with respect to the container top side. Since the container top side and the container base 09 are situated in parallel to one another, the carrier 12 is thus also oriented perpendicularly with respect to the container base 09. The holding device 13 together with the pipes 15 situated thereon is also pivoted along with the carrier 12. The holding device 13 accordingly assumes an upper holding position.

Figure 4:
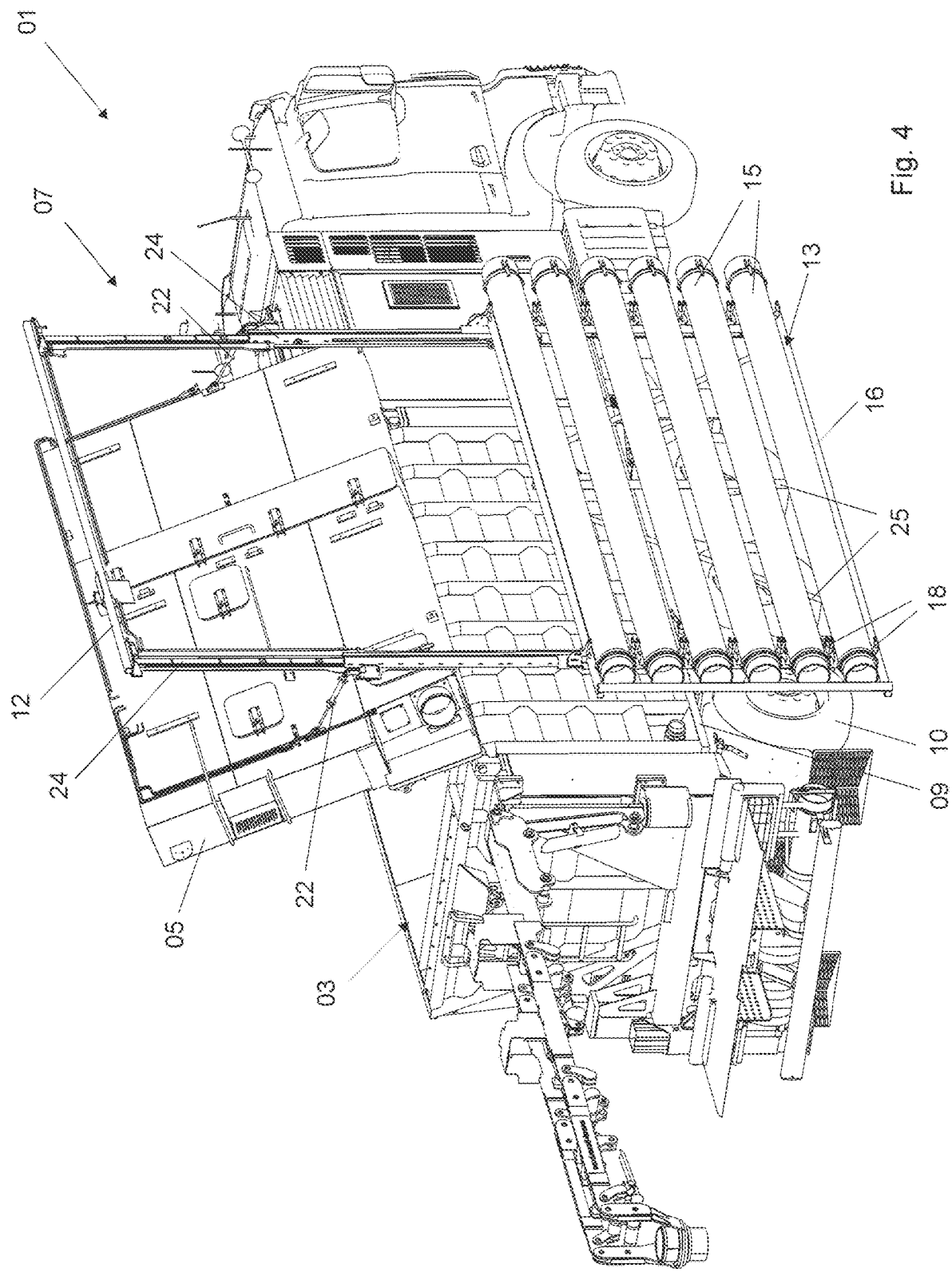
FIG. 4 shows a perspective view of the suction excavator, with the container cover tilted, a portion of the device pivoted, and a holding device moved into a lower position.

FIG. 4 shows a perspective view of the suction excavator 01. FIG. 4 initially resembles FIG. 3, wherein, in addition to the tilting of the container cover 05 together with the carrier 12 and the holding device 13 as well as the pivoted carrier 12 shown in FIG. 3, the holding device 13 is moved into a lower removal position. For this purpose, the holding device 13 and the carrier 12 are movably connected to one another via a rail guide 24. That is, the rail guide 24, made up of two rails, allows a movement of the holding device 13 relative to the carrier 12 along the rail longitudinal axis. The carrier 12 and the holding device 13 are movable in parallel to one another. One rail is fastened to the holding device 13, and a corresponding rail is fastened to the carrier 12. A stepwise movement between the upper holding position and the lower removal position is preferably possible. The holding device 13 is movable between the upper holding position and the lower removal position, perpendicular to the container base 09, so that the pipes 15 situated on the holding device 13 may be removed by the operator with little effort. Prior to the removal, the safety mechanism is unlocked, thus releasing the pipes 15 in the receptacle 18. In the lower removal position, the lower side of the holding device 13 is situated at a level between the container base 09 and the ground. The movement of the holding device 13 takes place by means of a drive unit. The rack 16 has braces 25 for stabilizing the holding device 13.

Figure 5:
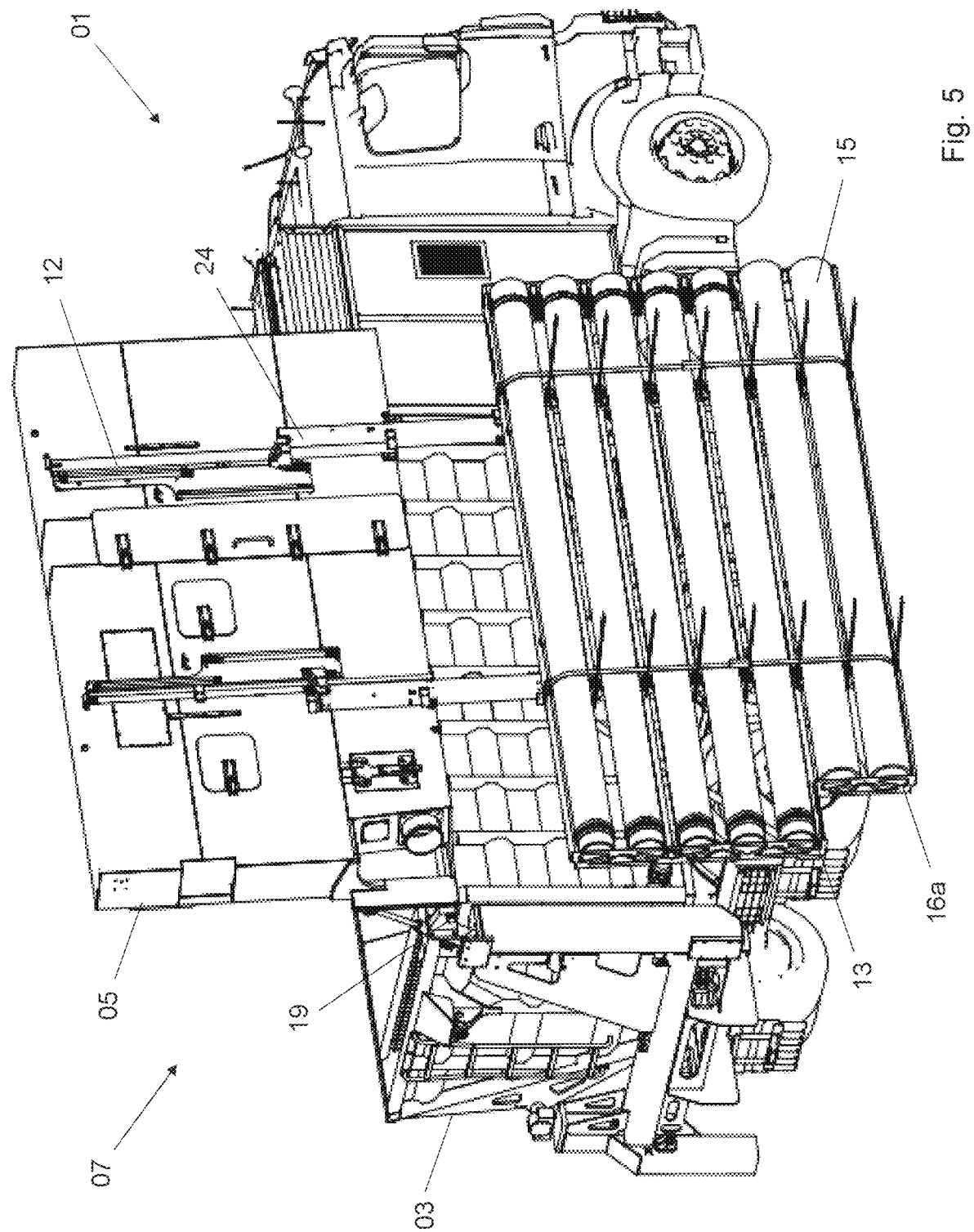
FIG. 5 shows a perspective view of the suction excavator together with the material collection container, with an open container cover, on which a second embodiment of the device for receiving and transporting pipes or tubes is mounted.
Figure 6:
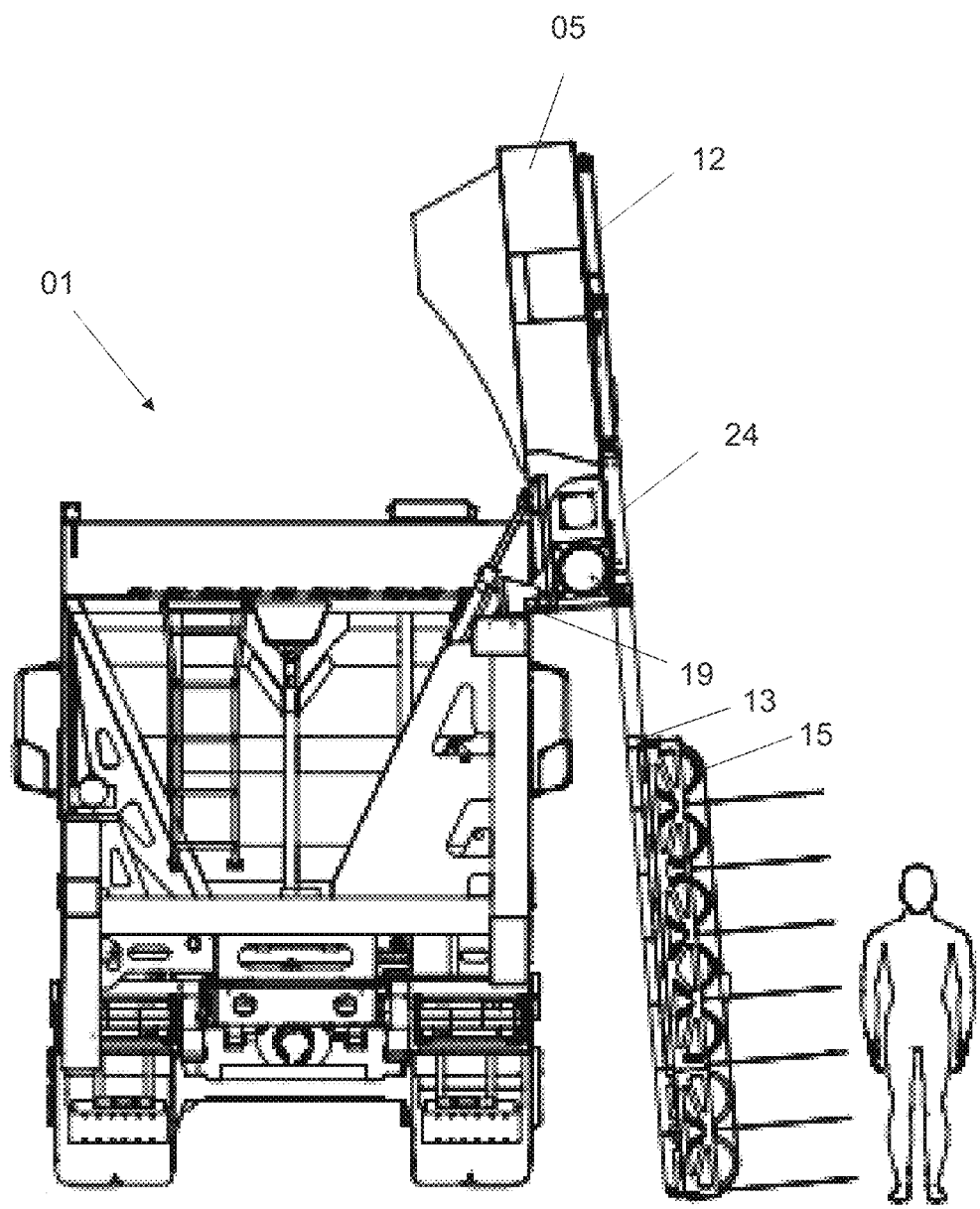
FIG. 6 shows a rear view of the suction excavator together with the second embodiment of the device.

FIGS. 5 and 6 show the suction excavator 01 together with the device 07 according to a modified embodiment. A significant difference from the above-described design is that the carrier 12 is no longer pivotable, and instead is fixedly mounted on the container cover 05. To remove the pipes 15 from the holding device 13, the container cover 05 is initially opened wide until it is preferably essentially vertical, i.e., at an angle of approximately 85° with respect to the upper edge of the container. The carrier 12 is then automatically in the working position without having to be pivoted with respect to the container cover.

In FIGS. 5 and 6 the holding device 13 is already moved into the lower removal position. In this case as well, the rail guide 24 is used for this purpose.

The design shown in FIGS. 5 and 6 also has further modified details, as discussed below. These details may in principle also be applied in the design according to FIGS. 1 through 4.

The holding device 13 includes a modified rack 16a in which up to 34 m of pipe can be transported. For this purpose, five receptacles for pipes up to 5 m long and two receptacles for pipes up to 4.5 m long are provided. The pipes are individually inserted into the receptacles and secured with hook and loop fasteners. Due to dispensing with a clamping mechanism for the pipes, the receptacles may be situated closer to one another, thus providing more space for the pipes. For transport on the street, tensioning straps may also be pulled over the pipes for additional security.

To move the holding device 13 along the rail guide 24, hydraulic telescoping push arms are used which form the drive unit and replace the above-mentioned cable winch.

The device 01 preferably has approximately the same width as the container cover, and results in only a minor increase in the upper part of the vehicle 01, for example by approximately 30-40 cm maximum.

The invention claimed is:

1. A suction excavator: comprising
a material collection container for a vehicle, wherein the material collection container comprises a container base, a container cover that is tiltable about a cover axis extending along a longitudinal direction along the suction excavator, and which is pivotable into an open position in which the angle between the container cover and the container base is between 80° and 90°; and
a device situated on the container cover for receiving and transporting pipes or tubes, wherein the device includes:
a carrier that is mountable on the container cover;
a holding device for accommodating at least one pipe or tube, wherein the holding device is connected via at least one rail guide to the carrier and movable in parallel to same; and
a drive unit for moving the holding device relative to the carrier between an upper holding position and a lower removal position in which the lower end of the holding device is situated in the plane of the container base or below this plane.

2. A suction excavator according to claim 1, wherein the carrier is nonpivotably fastened to the container cover.

3. The suction excavator according to claim 1, wherein the main plane of extension of the carrier in a working position is oriented at a right angle with respect to the plane of the container base.

4. The suction excavator according to claim 1, wherein the drive unit for moving the holding device is selected from the following drive units:
a cable winch together with an electric motor;
an actuating cylinder;
one or more hydraulically actuated telescoping push arms.

5. The suction excavator according to claim 1, wherein the rail guide situated between the carrier and the holding device is oriented at a right angle to the cover axis of the tiltable container cover.

6. The suction excavator according to claim 2, wherein the main plane of extension of the carrier in a-working position is oriented at a right angle with respect to the plane of the container base.

* * * * *